United States Patent [19]

Stevenson et al.

[11] 4,186,759
[45] Feb. 5, 1980

[54] CLOSED SYSTEM QUICK COUPLING HEAD ASSEMBLY

[75] Inventors: James S. Stevenson, Oakland; John J. Rodriques, Orinda, both of Calif.

[73] Assignee: Terminator Products, Inc., Oakland, Calif.

[21] Appl. No.: 931,163

[22] Filed: Aug. 4, 1978

[51] Int. Cl.² ............................................. F16K 19/00
[52] U.S. Cl. ................................... 137/240; 251/357; 141/91; 134/166 R; 222/484; 222/400.7
[58] Field of Search ..................... 222/144.5, 148, 478, 222/481-489, 501, 510, 559, 400.7; 141/89-92; 134/166 R, 169 R; 137/205, 212, 238, 317, 322, 323, 240; 251/357

[56] References Cited

U.S. PATENT DOCUMENTS

| | | | |
|---|---|---|---|
| 2,770,402 | 11/1956 | Quak | 222/400.7 |
| 2,847,043 | 8/1958 | Sommers | 222/484 |
| 4,092,993 | 6/1978 | Stevenson | 137/563 |
| 4,144,901 | 3/1979 | Stevenson | 222/400.7 |

Primary Examiner—H. Grant Skaggs

[57] ABSTRACT

A coupling head assembly for coupling a source container of chemical in a closed system, the assembly including a main passageway for flow of chemical from the container, an auxiliary passageway for rinsing the container when connected to a source of rinse liquid, and a second auxiliary passageway connectable to such source of rinse liquid for rinsing at least one flow line of the system to the exclusion of the container. A control device provides for performing each of the three functions. While withdrawing the chemical from the container, the control device informs the operator by a signal, of the functioning status of the coupling head assembly.

7 Claims, 6 Drawing Figures

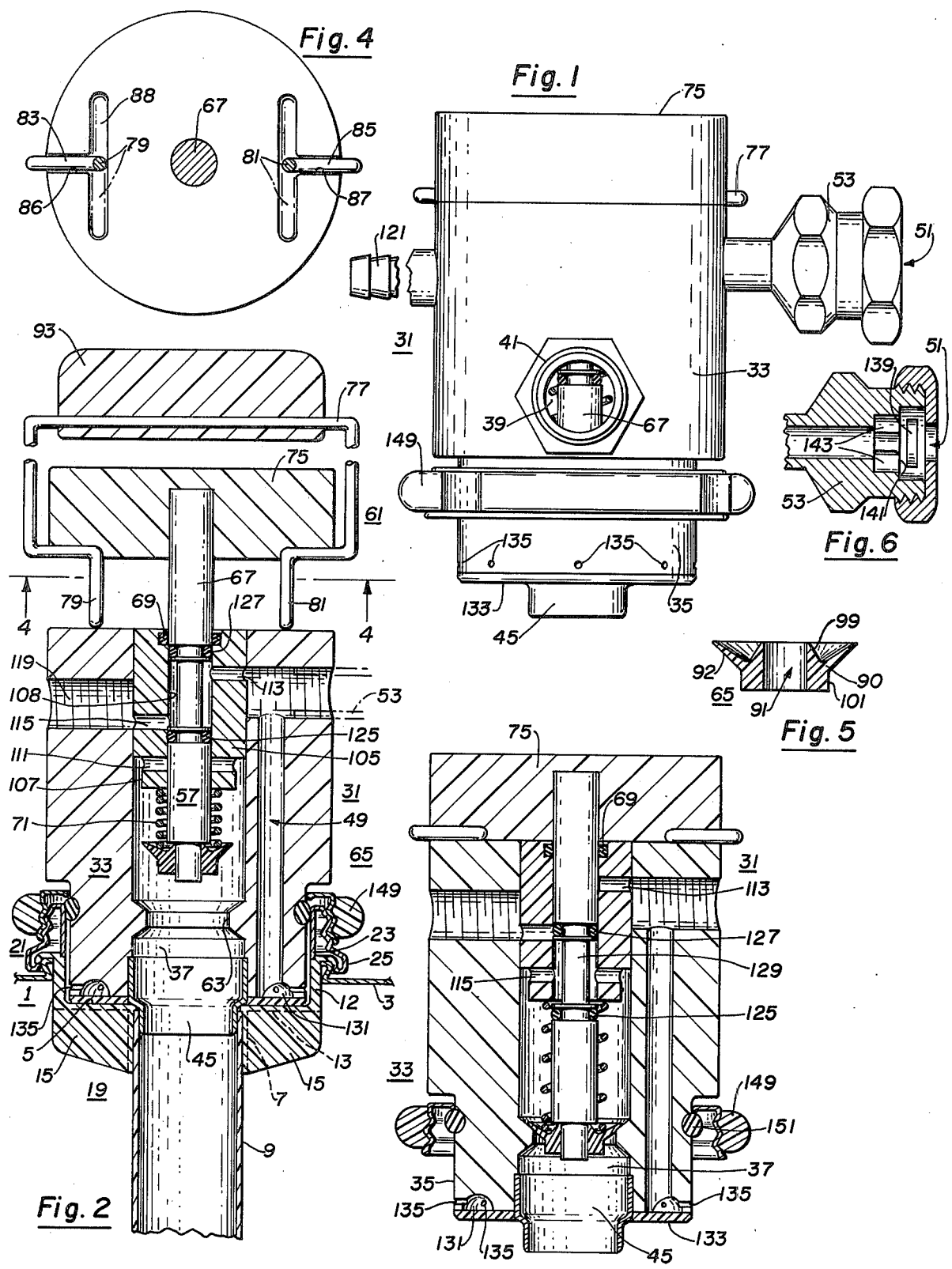

CLOSED SYSTEM QUICK COUPLING HEAD ASSEMBLY

THE INVENTION

The invention relates primarily to closed systems in the transfer of chemical from the original container to a mix tank, and more particularly to a quick coupling head assembly for effecting a flow connection to such container.

While many of such chemicals are relatively safe to handle, certain of such chemicals are very hazardous, even to the extent of being deadly if one comes in contact therewith.

With respect to these more hazardous chemicals, more and more legislation is coming into existence, aimed at protecting an operator who must handle such chemicals, as in the preparation of solutions or mixtures thereof with a base liquid for spray purposes.

As a result, what have come to be known as closed systems have been developed, wherein, basically, a pump system including a mix tank for holding the base liquid and the resulting solution or mixture, has means for coupling to the source container for withdrawing the chemical therefrom and mixing it with the base liquid, and without the necessity of exposing the operator to contact with the chemical involved.

Futher with regard to such hazardous chemicals, it is highly desirable, prior to the disposal of the empty source containers, that such containers be thoroughly rinsed to remove any residual chemical or droplets from the wall surfaces, and such requirement is becoming the subject of legislation in the various states.

Also in this connection, as a further protection to an operator, at least the main hose line carrying the chemical to the mix tank, and desirably, additional hose lines of the system through which the concentrated chemical may flow, should also be rinsed.

In our pending application Ser. No. 903,864 for "Container Built-In Probe Assembly And Coupling Head Assembly Therefor", we have illustrated and described a chemical container with a built-in probe assembly along with a coupling head assembly adapted to quick couple such container in a closed system of the type referred to. The present invention relates to a modified and improved quick coupling head assembly for use with a container having a built-in probe of the type illustrated and described in our aforementioned pending application.

Among the objects of our invention are:

(1) To provide a novel and improved coupling head assembly for use with a container having a built-in probe assembly for coupling a built-in probe container in a closed system, which coupling head assembly facilities the rinsing of the container and hose lines of the system, after emptying the container of its original contents;

(2) To provide a novel and improved coupling head assembly incorporating means for indicating to an operator, the functioning status of the coupling head assembly;

(3) To provide a novel and improved coupling head assembly incorporating a novel and improved valve which is chemically resistant to all known chemicals employed in the pesticide industry;

(4) To provide a novel and improved valve primarily for use in apparatus designed for the handling of pesticides.

Additional objects of our invention will be brought out in the following description of a preferred embodiment of the same, taken in conjunction with the accompanying drawings wherein:

FIG. 1 is a view in elevation of a coupling head assembly embodying the present invention;

FIG. 2 is a longitudinal view in section through the coupling head assembly of FIG. 1, depicting it in the adjustment adapting it for the withdrawal of chemical from a source container and for the rinsing of such container, this view additionally depicting the manner of quick coupling head assembly to a container with a built-in probe assembly;

FIG. 3 is a corresponding view in section through the coupling head assembly of FIG. 1 depicting it in an alternate adjustment, rendering it capable of rinsing flow lines of the closed system;

FIG. 4 is a view in section taken in the plane 4—4 of FIG. 2;

FIG. 5 is a view in section through the valve depicted in FIG. 2; and

FIG. 6 is a view in section through a valve controlled vent assembly involved in the invention.

Referring to the drawings for details of our invention in its preferred form, the coupling head assembly has been designed primarily for coupling to a container 1 having a wall 3, preferably the top wall, formed or provided with a recessed area 5 having a short passageway 7 extending through and downwardly therefrom, and of a diameter to snugly receive a probe 9 which extends to the bottom of the container.

The recessed area may, in general, be described as involving a cylindrical wall 12 and bottom 13, the central passageway extending through and down from the bottom and being reinforced by bracing ribs 15.

In addition to the central passageway, the recessed area is provided with large diametrically located bottom openings, one to either side of the central passageway and extending part way up the cylindrical side wall to provide contiguous side wall openings, the area of the combined bottom and side wall openings being such as to satisfy one's requirement for hand pouring of the contents of the container.

The provision of the pour openings leaves the bottom of the recessed area defining a cross piece 19 incorporating the central passageway.

A pour spout 21, preferably of metal, formed with an inner cylindrical wall 23 and an outer threaded wall 25, is affixed to the upper wall of the container in alignment with the recessed area as a permanent part of the container.

This built-in probe is described in greater detail in our aforementioned application.

The coupling head assembly 31 of the present invention for use with such type of probe includes a coupling head 33, preferably of plastic and having a reduced end 35 adapted to comfortably fit into the recessed area of the container. In alignment with the probe of the container, the coupling head is provided with a main passageway including a longitudinal portion 37 extending upwardly from the bottom and terminating short of the upper end of the coupling head, and a radial or lateral portion 39 extending from the longitudinal portion of the main passageway to the outer wall of the coupling head, where a hose fitting 41 is installed for attachment of a hose line to form a closed system, such for example as is disclosed in Stevention U.S. Pat. No. 4,092,993 of June 6, 1978 for METHOD AND APPARATUS FOR PREPARING CHEMICAL SOLUTIONS.

Press fitted into the lower end of the main passageway is a tapered fitting 45, preferably of metal, which constitutes an extension of the main passageway into the recessed area of the container to provide a friction tight leak proof connection to the probe, when the coupling is installed on the container, thereby providing a flow passageway for withdrawal of chemical from the container in a closed system.

Such withdrawal of chemical can only be accomplished with a concurrent intake of air into the container to preclude formation of a vacuum condition therein. An upwardly directed auxiliary passageway 49 alongside the longitudinal portion of the main passageway, connects with a vent 51 in a fitting 53 installed in the wall of the coupling head. This provides for such intake of atmosphere as the contents of the container is withdrawn therefrom.

The friction tight fit between the main passageway fitting 45 and the probe 9 precludes any intercommunication between the main passageway and the vent passageway at this point.

To enable an operator to control the withdrawal of chemical from a container so coupled, control means are provided in the coupling head assembly, in the form of a main valve assembly 57 spanning the main passageway in the longitudinal portion thereof, preferably adjacent the radial portion 39, the valve assembly being controlled manually by a control handle assembly 61 located adjacent the top of the coupling head.

The valve assembly, in its preferred form, involves a circular bead 63 on the inner wall of the main passageway to constitute a valve seat for a valve 65 disposed above the valve seat and provided with a valve stem 67 slidably passing through the upper end of the coupling head and sealed therein by an O-ring seal 69 installed in a groove encircling the valve stem. A compression spring 71 encircling the valve stem, under compression between the valve and the upper end of the coupling head, serves to normally maintain the valve seated against the valve seat to constitute a normally closed valve.

Opening of the valve is accomplished by raising it against the action of the compresssion spring, and this is accomplished by the control handle assembly which is affixed to the upper exposed end of the valve stem and provided with a built-in lift cam feature.

Such control handle assembly includes a cylindrical knob 75, preferably of plastic and affixed at its center to the exposed end of the valve stem as by press fitting the same thereon, and a handle 77 rotatably fitted to the underside of the knob and provided with a pair of symmetrically disposed cam extensions 79, 81 adapted upon rotation of the handle, to engage the approximate end of the coupling head to effect a separation of the knob from the coupling head with a resulting lifting of the valve from its valve seat.

The handle component may be fabricated of bar or heavy gauge wire material to the shape of a rectangle of a length slightly exceeding the diameter of the knob, the end portions of the bar or heavy gauge wire material being bent at right angles to the adjacent portions 83, 85 provide the cam extensions 79, 81 respectfully.

The underside of the knob is provided with a radial groove 86, 87 at each end of a diameter, and an intersecting groove 88, 89 at the inward end of each of the radial grooves 86, 87 respectively, such grooves being of sufficient length to receive the cam extensions and the adjacent portions of the handle, when the handle occupies a position at right angles to the longitudinal axis of the coupling head.

With the hand in this position and the knob installed on the valve stem in substantial contact with the proximate end of the coupling head, the handle will be retained in its assembled position, and, upon rotating the handle 90 degrees upward, the cam extensions will engage the proximate surface of the coupling head and cause the valve to be lifted from its valve seat, against the restoring action of its spring.

Since the handle in the open position of the valve extends above the coupling head, it ccupies a position readily observable by an operator from a distance, and thus can function as a means for informing an operator of the functioning status of the coupling head assembly. Such visual indication can be materially amplified by the installation of suitable signal means 93 on the handle in the form of a flag or comparable visual indication.

The design of valve in the main flow passageway coupled with the material of which it is fabricated, constitutes an important feature of the present invention.

Insofar as applicants are aware, there is no commercial valve available which will withstand contact with all known chemicals employed in the pesticide industry, without deterioration of the valve. Of the many plastics known to the trade, the one identified by the name "Delrin" will withstand contact with all known chemicals employed in the pesticide industry, without deterioration, and though it also has an excellent memory, it does not have the characteristics of soft rubber, desired for valve sealing, but is rather hard and would not, therefore, suggest itself for use as a valve material.

Through experimentation, however, we have found that by proper design, we have been able to impart sufficient resiliency to a valve of this material, to enable it to effect a perfect seal against a valve seat to meet all requirements for a valve under these extreme conditions. Such valve, in addition, however, must be securely mounted on its stem to enable such valve when made of such material, to withstand the pressures to which it will be exposed.

After much trial and error, it was found that a cone shaped wafer of "Delrin" having a central hub 90 with a stem opening 91, and a conical wall 92 which tapers to a very thin cross-section, could satisfy the rigid requirements for forming a very effective seal against a valve seat, the memory of the material in combination with the flexibility characteristics imparted to the valve by the design thereof, being deemed responsible for the effective sealing of this valve under the rigid conditions which had to be met. "Delrin" is the trade name for acetal resin marketed under that name by Du Pont de Nemours, EI & Co., Inc.

To successfully install such valve on its valve stem, as by press fitting the valve thereon, to better enable the valve to withstand the pressures to which it will be subjected in use, the hub or central portion of the valve is extended axially into the region defined by the conical wall to form a protubrance 99, and axially in the opposite direction to form an extension 101, the later extension being of a greater diameter than the first extension to provide a solid seat for the valve spring 71.

The hub as thus extended in both directions will, when the valve is press fitted upon its stem, offer considerably increased resistance to pressure applied thereto by the spring, thereby assuring stability as to its location on the valve stem.

Further, with all that mass build up at the hub of the valve, flexing will occur predominantely along the free end portion of the valve wafer where it engages the valve seat, thereby increasing its effective sealing ability.

As thus far described, the coupling head assembly is capable, at the will of the operator, or allowing withdrawal of chemical from the container and discharging same to a mix tank while providing an indication to the operator of the functional status of the coupling head assembly.

To accomplish rinsing of the container and hose lines of the system following emptying of a container, we provide within the coupling head assembly, selectively alternate auxiliary passageway, one leading to the container itself for rinsing the container and the other leading to the main flow passageway, down stream of the main valve, for rinsing hose lines of the system.

Toward this end, a cylinder 105 of diameter equal to that of the main passageway in the coupling head, has one end reduced to provide a neck 107. Axially of the plug is a passageway 108 adapted to slidably receive the valve stem of the main valve assembly, a groove within the plug adjacent the larger end thereof containing the O-ring seal 69 to frictionally seal the valve stem in its passage through the plug. A passageway 111 is drilled diametrically through the neck portion of the plug while a radial passageway 113 is provided in the larger end of the plug in proximity to the valve stem seal. A second radial passageway 115 is provided at a location intermediate the neck passageway 111 and the radial passageway 113 adjacent the stem seal.

This plug is press fitted into the coupling head after drilling the longitudinal portion of the main flow passageway all the way through the coupling head. With the plug thus installed, the radial passageway 113 adjacent the stem seal 109 should be located in flow communication with the passageway 49 to the container. A radial passageway 119 in the coupling head is provided at a location communicating with the intermediate radial passageway 115 in the plug. This radial passageway in the coupling head has installed at its exposed end, a hose fitting 121 to enable connection of a hose line to a source of rinse liquid.

With the valve in its closed position, the valve stem carries an O-ring seal 125 slightly below the passageway through the neck portion, and a second O-ring seal 127 between the two radial passageways 113 and 115, while between the two O-ring seals, the valve stem is reduced in diameter to provide a narrow section 129 and create a flow space along this portion of the stem.

Thus, in the closed position of the valve, the source of rinse liquid will have access to the main passageway leading to the hose lines of the system, whereby rinse liquid supplied under pressure can affect a rinsing of hose lines.

Upon opening up of the valve, the O-ring seal 125 will rise sufficiently to seal the passageway to the hose lines, while the other O-ring 127 seal will rise sufficiently to expose the remote radial passageway 113 to the source of rinse liquid, which can then flow downward toward the container via the vent passageway 49 into the container.

To cause such liquid, however, to rinse the container, a groove 131 is formed in the lower end of the coupling head, concentric with the main flow passsgeway, such groove then being capped by a disc 133 press fitted over the tapered fitting 45 to form a rinse channel which is provided with small openings 135 in the outer wall thereof to permit the rinse liquid to spray out through these various openings into the container.

To assure, however, that the rinse liquid will take a course downward through the vent passageway 49, the vent 51 itself must automatically be blocked to preclude escape of rinse liquid therethrough. This is accomplished by the provision of a vent valve in the form of a disc 139 preferably of soft rubber, disposed adjacent the vent and capable of being urged against the vent by the presence of rinse liquid in the vent fitting. In the absence of rinse liquid, the vent valve is precluded from blocking the intake of air into the coupling head assembly, as it is restricted as to inward movement, by a shoulder 141 having radial grooves 143 extending beyond the periphery of the valve, whereby the valve, while in open condition can never block communication with the passageway through the fitting to the vent passageway in the coupling head.

The coupling head assembly is made quickly connectible to a container having a built-in probe of the type described, by installing around the lower end of the coupling head, a coupling collar 149 resting on a large O-ring 151 installed about the coupling head, the collar having an internal thread matching that of the pouring spout on the container, whereby, following insertion of the reduced end of the coupling head into the recessed area of the container, the collar may be screw threaded to the pouring spout and tightened, causing the pouring spout to seal itself to the O-ring which supported the coupling collar. Then the rinse openings will be exposed to the interior of the container whereby the spray engendered thereby will spray the roof and walls of the container, and since, during such rinsing, the main valve is in its up position, the resulting rinse liquid solution can be withdrawn as it accumulates and then discharged, preferably to the mix tank of the system, to thereby not only maintain safe conditions but also enable use of such chemical for its intended purpose.

Following such rinsing, should one then desire to rinse the hose lines of the system, all that is necessary is to lower the valve to its closed condition which, in turn, places the hose lines in flow communication with the source of rinse liquid to rinse the hose lines, the resulting rinse liquid solution also going to the mix tank.

It is understood, of course, that during normal withdrawal of concentrated chemical from the container, the source of rinse liquid is cut off by means of any suitable valve or the like in the system.

In many closed system installations, a number of containers containing different chemicals may be coupled in the system. the various chemicals to be selectively added as desired. In prior installations of this sort, such containers were connected to a common manifold having a number of valves, each valve controlling one of the containers. With such an installation it was quite difficult to determine at a glance, which container was in service.

In accordance with the present invention, each container is provided with its own individual coupling head assembly which as previously described, incorporates its own readily observable indication of the container being used.

From the foregoing description of our invention in its preferred form, it will be apparent that the same is subject to alteration and modification without departing from the underlying principles involved, and we, accordingly, do not desire to be limited in our protection to the specific details illustrated and described, except as may be necessitated by the appended claims.

We claim:

1. A coupling head assembly for coupling a container in a closed system, said coupling head assembly including a coupling head having an end portion adapted for insertion into an opening in such container, said coupling head having a main flow passageway therethrough, extending from the insertable end of said coupling head, for flow connecting such container in a closed system to a hose line for withdrawing chemical from such container, a valve seat in said main flow passageway, a main valve in said main flow passageway adapted to engage said valve seat to block said passageway, means normally urging said main valve into engagement with said valve seat, means for removing said valve from its valve seat to open said valve, alternate rinse passageways in said coupling head, one of said rinse passageways terminating at the insertable end of said coupling head for communication with the interior of such container for rinsing the same, the other of said rinse passageways terminating in said main passageway, downstream of said main valve, for supplying rinse liquid to said main flow passageway for rinsing of at least one hose line of such closed system, and means for switching said rinse passageways with respect to a source of rinse liquid, in response to opening and closing of said main valve.

2. A coupling head assembly in accordance with claim 1, characterized by said means for switching said rinse passageways in response to opening and closing of said valve functions to render said container rinse passageway operable in response to opening of said main valve.

3. A coupling head assembly in accordance with claim 1, characterized by means responsive to said valve opening means for indicating the open condition of said main valve.

4. A coupling head assembly in accordance with claim 1, characterized by said main flow passageway including a longitudinal portion terminating at one end in the insertable end of said coupling head, and a lateral portion, with said valve seat in said longitudinal portion, at approximately the junction of said lateral portion with said longitudinal portion; and further characterized by said means for opening said valve including a valve stem affixed at one end to said valve and slidably passing through the end of said coupling head opposite said insertable end via a passageway through said opposite end, and means externally of said coupling head and connected to said stem for exerting a pull on said stem to remove said valve from said valve seat.

5. A coupling head assembly in accordance with claim 4, characterized by said container rinse passageway including a portion substantially paralleling the longitudinal portion of said main flow passageway, a lateral portion from said parallel portion and terminating at said stem passageway, and an intake portion at one end connectible to a source of rinse liquid and terminating at its other end at a location on said stem passageway intermediate the location of the lateral portion of said container rinse passageway and said main valve; and further characterized by said other rinse passageway including a passageway portion formed by said stem having a portion of reduced cross-section, said portion of reduced cross-section, in the closed position of said main valve, being exposed at one end to the intake portion of said container rinse passageway and extending from the stem passageway into said main passageway; and further characterized by said rinse passageway switching means including sealing means carried by said stem between said intake portion and the lateral portion of said container rinse passageway in the closed condition of said main valve and adapted, upon opening of said main valve, to expose said lateral portion to said intake portion via said reduced portion of said valve stem, and sealing means carried by said valve stem in spaced relationship to the entrance from the main passageway to said stem passageway in the closed condition of said main valve and adapted to block said entrance upon opening of said main valve.

6. A coupling head assembly in accordance with claim 1, characterized by said valve including a conical shaped wafer having a wall tapering to a thin edge.

7. A coupling head assembly in accordance with claim 6, characterized by said conical shaped wafer being formed from the plastic "DELRIN".

* * * * *